Jan. 6, 1931.    G. L. ROSEBROOK    1,787,763
CONVEYER MEANS FOR WHEELED VEHICLES
Original Filed July 2, 1928    2 Sheets-Sheet 2
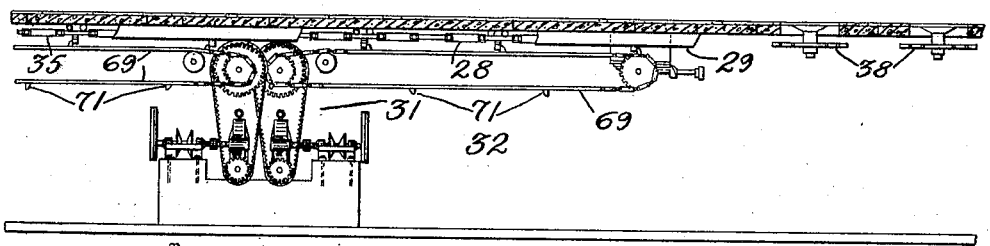
Fig. 3
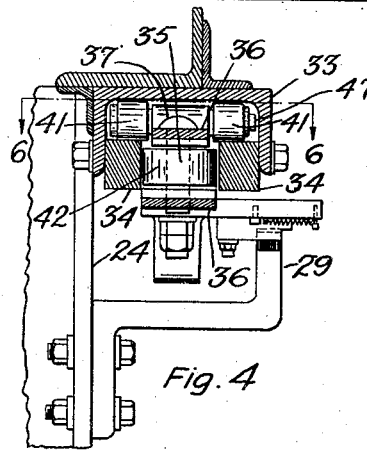
Fig. 4
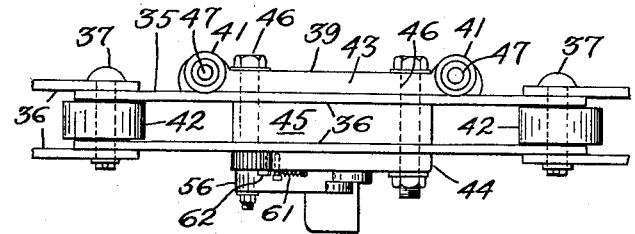
Fig. 5
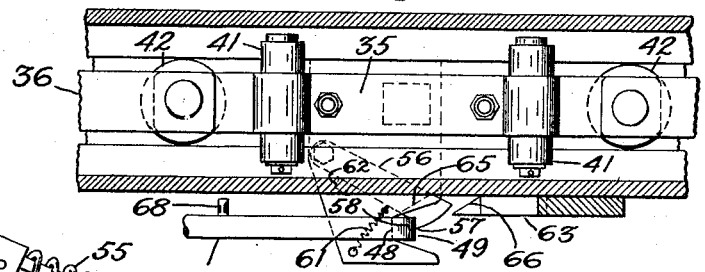
Fig. 6
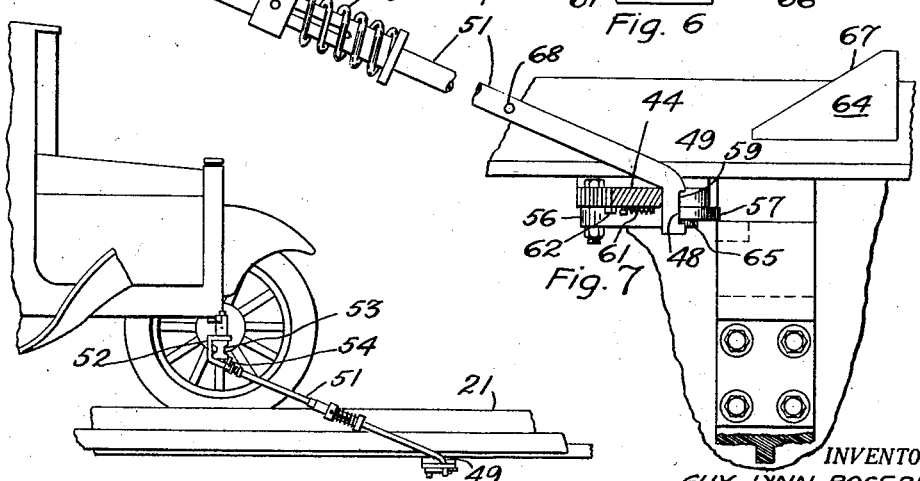
Fig. 7
Fig. 8
INVENTOR.
GUY LYNN ROSEBROOK
BY
HIS ATTORNEY.

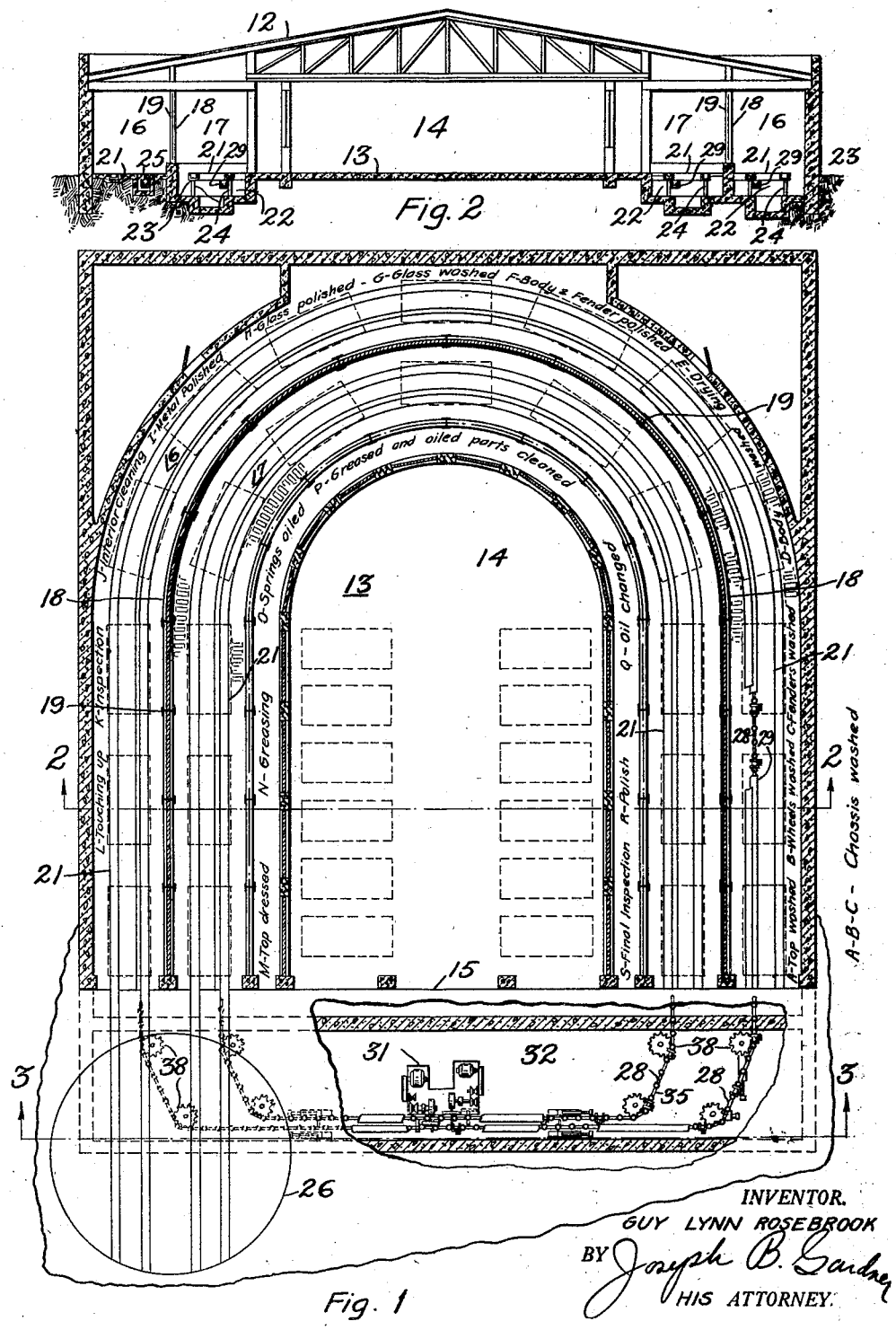

Patented Jan. 6, 1931

1,787,763

UNITED STATES PATENT OFFICE

GUY LYNN ROSEBROOK, OF OAKLAND, CALIFORNIA, ASSIGNOR, BY DIRECT AND MESNE ASSIGNMENTS, OF ONE-THIRD TO GRACE L. JEWETT, OF PIEDMONT, CALIFORNIA, AND ONE-THIRD TO VERNER HERMANSON, OF OAKLAND, CALIFORNIA; VICTOR HERMANSON EXECUTOR OF SAID VERNER HERMANSON, DECEASED

CONVEYER MEANS FOR WHEELED VEHICLES

Original application filed July 2, 1928, Serial No. 289,772. Divided and this application filed July 11, 1928. Serial No. 291,708.

The invention relates to a conveyer means particularly adapted for effecting the movement of a vehicle along a fixed path, as in my copending application, Serial No. 289,772 filed July 2, 1928, of which this application is a division.

An object of the invention is to provide a means of the character described which is particularly arranged for operative use in drawing a vehicle along a curved path lying in a substantially horizontal plane.

Another object of the invention is to provide improved support and guiding means for a chain comprising part of the means.

A further object of the invention is to provide improved means for releasably securing a load to the chain.

A still further object of the invention is to provide means for automatically disconnecting the load from the chain at a predetermined point in the path of movement of the load.

The invention possesses other objects and features of advantage, some of which, with the foregoing, will be set forth in the following description of a preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figure 1 is a plan view showing an installation of the chain in a vehicle servicing apparatus, parts of the structure being broken away to disclose chain operating mechanism.

Figure 2 is an elevation of the apparatus and a building housing the same taken at the line 2—2 in Figure 1.

Figure 3 is a sectional view taken on the line 3—3 of Fig. 1, and particularly disclosing a conveyer operating means of the device.

Figure 4 is an end view of a link of the chain in a guideway and support therefor, the latter being shown in transverse section.

Figure 5 is a side view of the chain link shown in Figure 4.

Figure 6 is a view taken on the line 6—6 in Figure 4.

Figure 7 is a side view showing a draw-bar engaged between the link shown in Figure 8 and the axle of a vehicle.

Figure 8 is a reduced view showing the draw-bar in use.

As herewith particularly disclosed, the chain of my invention is incorporated with vehicle servicing apparatus provided in a building 12 having a floor 13 providing a floor space 14 terminating at a front line 15 thereof, which line as here shown is coincident with the front line of the building and is straight, it being noted, however, that such is not essential. Path portions 16 and 17 are defined on the floor 13, said portions having both ends thereof terminating at the line 15. Preferably, and as shown, the path portions 16 and 17 extend in generally parallel adjacent relation to each other whereby adjacent ends thereof make equal angles with the line 15. The path portions 16 and 17 are of somewhat greater width than is an automobile whereby side clearance for working on an automobile is provided, and the common line separating the path portions is preferably defined by a partition 18 having the larger portion thereof of glass and being supported by and between columns 19 of the building.

It will now be noted that the shape of the path portions 16 and 17 is determined largely by the shape of the floor space 14 provided behind the line 15. In the present instance, this floor space is substantially square and the path portions 16 and 17 have straight front parts extending substantially half of the depth of said floor space and connected by semi-circular parts, whereby the path portions are generally U-shaped and have minimum degrees of curvature.

Pairs of tracks 21 are provided for supporting and guiding a vehicle during its movement along the path portions 16 and 17. The tracks 21 extend centrally through the path portions and provide grooves for the reception of the automobile wheels whereby a vehicle may be steered to follow a path portion as it is moved therealong. Certain floor portions along the path portions 16 and 17 are lowered for the full widths of said portions to provide pits 22, and at such places the stringers 23 which support the tracks are in turn supported by posts or columns 24 extending from the bottom of the pits 22. The tracks, stringers and posts are preferably formed of steel sections whereby a pit space is occupied to a minimum extent. A trough 25 extends along the floor at an inner track of each pair, and between the pair of tracks, at all parts of the path sections which lack a pit, the purpose of this latter structure being hereinafter brought out.

Disposed in front of the line 15 opposite a pair of corresponding ends of the path portions 16 and 17 is a turntable 26 of any suitable structure and preferably having its axis of rotation midway between the lines of said path portions whereby an automobile placed thereon by being run thereonto from one path portion will, when the turn table is rotated through an angle of one hundred eighty degrees, be aligned with the other path portion for movement thereto. In this manner, an automobile leaving either one of the path portions at the turntable may be directed back into the other in an extremely simple manner.

Various stations are provided along the path portions at which different servicing operations are arranged to be performed. These stations are coterminous and may overlap where the servicing operations to be performed do not interfere. As shown, the stations along the outer path portion 16 relate chiefly to the cleaning operations, while the stations along the inner path portion include the greasing and oil changing operations. The exact order and positioning of the stations is desirably one by which the entire servicing process may be performed most efficiently, a typical arrangement being indicated in Figure 1 in which stations means are provided for facilitating the work to be done thereat, such means not being shown, however. As shown, stations A, B, ... S are indicated, the operations thereat being substantially as follows—A,—top washed; B,—wheels washed; C,—fenders washed; A—B—C,—chassis washed; D,—body washed; E—washed parts dried; F,—body and fenders polished; G,—glass washed; H,—glass polished; I,—metal polished; J,—interior cleaned; K,—inspection; L,—touching up; M,—top dressed; N,—bearings greased; O,—springs oiled; P,—greased and oiled parts cleaned; Q,—transmission oil changed; R,—final polish; and S,—final inspection.

Since the most efficient use of the structure and apparatus described will be effected if all of the automobiles being serviced at one time are caused to advance at a constant rate which will give sufficient time for the completion of each servicing operation at the different stations, power operated drag chains 28 are provided for effecting such control of the movement of the automobiles. The chains 28 are supported in guideways 29 provided along and adjacent the innermost tracks 21, said guideways being mounted on the posts 24 and on a side of the trough 25 whereby they extend continuously through the pits 22 and troughs 25. As shown, a chain operating mechanism 31 is disposed in a cellar or pit 32 provided below the floor plane and generally in front of the line 15, and separate chains are provided for the different path portions, said chains being arranged to run in opposite directions.

The guideways 29, it will now be noted, comprise inverted channels 33 having opposed track strips 34 secured at the lower edges of their flanges. The links 35 of a chain are formed with flat and spaced side members 36 connected by pins 37 whereby the chain may engage and be supported by sprocket wheels 38 which carry the chain at certain points thereof between the tracks and chain operating mechanism. Fixed on certain of the links 35 are carriages 39, each carriage being provided with wheels 41 engaging the top edges of the track strips 34 for supporting the carriage and link on these strips. Rollers 42 are provided on certain of the link pins 37, preferably those at the ends of the links having the carriages 39, whereby an anti-friction contact is provided between the links and the inner track strips. It is noted that each chain 28 operates in a horizontal plane and that the pins 37 thereof are vertical, such being necessary on account of the curvature of the U-shaped path portions.

It will now be noted that each carriage 39 is provided by securing plates 43 and 44 respectively to the upper and lower link side members 36. As shown, a spacer 45 is disposed between the side members 36, and bolts 46 are engaged through this spacer, the side members 36, and the plates 43 and 44. Mounted in and across the plate 43 are axles 47 carrying the wheels 41 at the opposite ends thereof. Each lower carriage plate 44, it is noted, extends laterally outwardly of the track 34 thereat and toward the cooperating track. The forward edge of the extending plate portion is provided with a notch 48 for engagement with one end 49 of a draw-bar 51. The other end of the draw-bar 51 is provided with a hook portion 52 for engagement with an axle 53 of an automobile to be towed by the chain, said bar, when operatively disposed, being oblique to the horizontal, as is particularly shown in Figures 7 and 8.

Detent means are preferably provided for releasably retaining the draw-bar in engagement with the axle 53 when the bar is operatively disposed. A spring pressed catch member 54 is here shown mounted on the draw bar 51 adjacent the hook 52 thereof for cooperation with said hook to grip the axle. The member 54, it is noted, is arranged to be rendered inoperative by and upon an upward swinging of the draw-bar, yet maintains its operativeness as long as the bar is operatively disposed. Preferably and as shown, the bar 51 is formed with telescopically engaged sections having a compression spring 55 operatively engaged between them in the bar whereby shocks of sudden pulls may be absorbed in the bar.

Means are also preferably provided for securing the lower bar end 49 in the notch 48, and as shown, such means comprise a member 56 pivoted to the lower face of the plate 44 for movement thereover. The member 56, it is noted, is provided adjacent its free and forward end with a lateral extension 57 having an edge 58 thereof arranged to be swung into position against the front side of the bar end portion 49 when the latter is engaged in the notch 48. The bar portion 49 is provided with a notch 59 for the reception of the edge 58 whereby engagement of said edge in the notch 59 will prevent an upward displacement of the bar end. The member 56 is urged to retain its operative position by the action of a tenson spring 61 suitably connected between it and the plate 44 and a stop 62 is provided on the plate 44 against which the member 56 is arranged to engage for disposing it in operative relation to the notch 59 when the bar portion 47 is removed therefrom. The forward edge of the member 56 and its extension 57 are obliquely related to the longitudinal axis of the carriage whereby a bar end 49 held in the path of movement thereof may deflect the member for entering and becoming imprisoned in the notch 59.

Means are provided for effecting an automatic release of a bar 48 from a carriage 39 when the exit end of a path portion is reached, and as shown, such means comprise trip members 63 and 64 adjacent the guideway 29. The trip member 63, it is noted, is arranged to engage the catch 56 for disposing it in inoperative position, and while the member 56 is so disposed, the trip member 64 is arranged to effect a lifting of the bar portion 49 from the notch 48. As shown, the lower side of the catch member 56 is notched upwardly and from the front end thereof to define a surface 65, which, when the member is operatively disposed, is vertical and is oblique to the line of movement of the carriage and member, while the trip member 63 comprises a plate having an upper face portion 66 engageable against and along the surface 65 for forcing the member 56 out of its operative position while engaged therewith. The trip member 64 it is noted, comprises a plate providing an upper inclined edge 67 against which a pin 68 provided on the draw-bar is arranged to engage for lifting the bar from its engagement with the carriage while the catch member 56 is inoperatively disposed. A further manual lifting of the bar releases the bar hook 52 and the bar drops from the axle.

The draw, or power chains 28, it is noted, are preferably propelled by means of chains 69 operating therebelow in parallel relation thereto but with their axes of bending horizontal whereby they may gradually approach and recede from the power chains. Extensions 71 are provided on certain links of the chains 69, said extensions being spaced the same as are the carriages on the power chains, the relations preferably being such that at least two of the extensions 71 will be engaged behind the protruding portions of the plates 44 of successive carriages. At least one of the sprockets for each of the power chains is shiftable for taking up slack. Any suitable mechanism may be utilized for operating the chains 69.

I claim:

1. In a device of the character described, means providing a curved guideway for a power chain, a chain mounted in said guideway and having the links thereof pivoted for relative movement about vertical axes, carriages on certain of said links providing a rolling support for the chain in the guideway, and means extending laterally outwardly from one side of one of said carriages providing for operatively connecting the chain with an object to be moved in a path substantially corresponding to that of the chain.

2. In a device of the character described, means providing a curved guideway for a power chain, a chain mounted in said guideway and having the links thereof pivotally connected by vertically disposed link pins, rollers on certain of said link pins for engagement along the inner side of said guideway, and means projecting laterally outwardly from said chain beyond and beneath and one side of said guideway and providing for operatively connecting the chain with an object to be moved thereby.

3. In combination with a path over which vehicles are arranged to be drawn, means providing a drag chain guideway and support extending along the path, a chain, a carriage on said chain for supporting the chain in the guideway, a draw-bar for connecting said carriage with a vehicle, and a horizontally directed lateral extension of said carriage arranged to be releasably engaged by the draw-bar.

4. In combination with a curved path on a surface over which vehicles are arranged to be drawn in supported relation, means providing a power chain guideway and support extending along the path and below the plane of the floor, a power propelled chain in said guideway having the links thereof pivoted for relative movement about a vertical axis, a draw-bar for connecting said carriage with a vehicle, and a horizontally directed lateral extension of said carriage arranged to be releasably engaged by the draw-bar.

5. In a device of the character described, means providing a horizontally disposed curved guideway for a chain, and a power propelled chain engaged in said guideway for movement therethrough, the links of said chain comprising superposed and spaced members connected to each other and to adjacent links by means of pivot pins, a carriage for the chain fixed to the members of a link and providing an anti-friction support for the link in the guideway, means closing said guideway at the top thereof, a drag link for connection to said carriage, and means for releasably securing said drag link to the carriage.

6. In combination, a drag bar, a power driven chain, and means for connecting the bar to the chain comprising a lateral extension of a chain link providing a notch at the forward edge thereof for engaging said bar, a detent member carried on said extension and engageable with said bar for locking the same against removal from the notch, and means yieldingly urging said member to retain an operative engagement with said bar.

7. In a device of the character described, means providing a guideway for a power chain, a power driven chain engaged in said guideway, a drag bar, means for connecting the bar to the chain comprising a lateral extension of a chain link providing a notch at the forward edge thereof for engaging said bar, a detent member carried on said extension and engageable with said bar for locking the same against removal from the notch, means yieldingly urging said member to retain an operative engagement with said bar, means at a point of said guideway for inoperatively disposing said member, and means operative to remove the bar from the notch while the preceding means is inoperative.

8. In combination with a path over which objects are to be moved, means providing a drag chain guideway and support beneath said path, a power operated chain, means for supporting the chain in the guideway therefor, said means extending over and covering the upper side of said chain, and means disposed on one side of the chain and beneath said guideway and providing for operative connection of the chain with the object to be moved over said path.

9. In apparatus of the character described a pathway over which objects may be moved, an inverted channel shaped guide following the pathway, tracks within and on opposite sides of said guide, a power chain disposed in said guide, rollers on said chain respectively engaged with the upper sides and the opposed sides of said tracks, and means providing for operatively connecting the chain with an object to be moved over said pathway.

10. In apparatus of the character described, a pathway over which objects may be moved, an inverted channel shaped guide being substantially in line with and beneath said pathway, tracks carried within and on opposite sides of said guide, a power chain, rollers on said chain engaging said tracks, and means on the chain arranged to extend laterally beneath and to one side of said guide and pathway and providing for connecting the chain with an object to be moved over said pathway.

In testimony whereof, I have hereunto set my hand at Oakland, California, this 18th day of June, 1928.

GUY LYNN ROSEBROOK.